Patented Aug. 27, 1935

2,012,825

UNITED STATES PATENT OFFICE 2,012,825

PRODUCTION OF LARGE CRYSTAL METAL BODIES

Theodore Millner, Ujpest, and Paul Tury, Budapest, Hungary, assignors, by mesne assignments, to General Electric Company, a corporation of New York No Drawing. Application February 6, 1932, Serial No. 591,448. In Germany February 14, 1931

4 Claims. (Cl. 75—17)

Our invention relates to a process for the production of large-crystal metal bodies, such as blocks, bars, wires, sheets, bands, single or multiple spiralled incandescent bodies etc. from refractory metals such as rhenium, tungsten, molybdenum etc.

For the production of large-crystal metal bodies, such for example as tungsten wires, various processes have already been proposed. According to one known process a suitable additive material is incorporated in the metallic tungsten during manufacture, said additive material forming with any metallic oxides or any other compounds or impurities that may be contained in the metallic tungsten, a volatilizable slag. It is important in this process that the additive materials, which are incorporated with the metallic tungsten, be of such a nature that they and also the slags formed from them with the metallic oxides and other impurities, shall volatilize before the metal body produced from the tungsten powder has reached, in the course of its thermal treatment, the temperature of rapid grain-growth, that is to say, the sintering temperature. The principal feature of this process is, that all the additive materials, or the slags formed therefrom, or both, volatilize before or, at the latest, as soon as the sintering temperature of the metal body is reached.

We have now found that large-crystal metal bodies and even single-crystal metal bodies and, moreover, not only filaments but also bars, blocks, etc. such, for example as metallic tungsten bodies, can be produced advantageously by a process which differs completely from those hitherto employed. This process is based upon our discovery that the final size of the crystals of a metal body, both in the course of the crystallization of a metal body which has not been previously deformed and in the course of the re-crystallization of a cold-worked metal body, is generally affected very favourably if additive materials be incorporated with the metal, which do not volatilize out of the metal body even during the process of crystallization or re-crystallization and owing to the vapour pressure which they set up at the temperature necessary for crystallization or re-crystallization (such temperature lying above the sintering temperature), produce internal stresses which assist the formation of large crystals.

We have found that there are a great many compounds which answer the above mentioned requirements and it is therefore quite impossible to enumerate all of them. It can, however, be determined at any time by experiment whether any particular additive material is suitable for use in the new process. The most favourable quantity of the additive materials, with which the greatest grain-growth effect may be obtained, can also be determined by experiment. This effect decreases if a lesser quantity of the additive materials is used. On the other hand an excess of them obstructs the crystallization.

In the examination of a very large number of compounds we have found that the following are particularly suitable as additives to refractory metals such, for instance as tungsten viz.: certain simple and complex silicates, borates, phosphates, fluorides and other substances having a similar effect, for instance iron silicate, magnesium silicate, aluminium silicate, zirconium silicate, thorium silicate, uranium silicate, aluminium borate, thorium borate, uranium borate, beryllium phosphate, thorium phosphate, zirconium phosphate, uranium phosphate, calcium flouride, barium fluoride, and so forth; also their complex combinations, such as iron-aluminium silicate, magnesium-aluminium silicate, iron-magnesium borate and similar compounds, as well as mixtures of several of these materials. These materials do not escape, or at least do not escape completely from the metal body during sintering and, as has already been stated, it is of paramount importance for the intended effect of the new process that these additive materials cause the formation of large single-crystals by reason of the internal stresses set up by the vapour pressure, produced by these said materials at the high crystallizing or re-crystallizing temperature lying above the sintering temperature. It is obviously of no importance, whether the said additive materials still remain behind in the metal body after they have exerted the action which assists the growth of the crystals therein in the course of the final crystallization or re-crystallization process or whether they subsequently escape therefrom wholly or in part.

Furthermore it is of no importance, as far as the new process is concerned, whether the metal bodies from which the start is made, also contain volatile substances such as impurities, for instance iron oxide, alkalies or other similar substances which are volatile below the sintering temperature and which escape from the said metal bodies, when these are heat-treated prior to crystallization or re-crystallization, as the action on which this process is based, is only produced by additive materials which do not escape when the bodies are sintered, but are still present during the subsequent crystallization or recrystallization and produce internal stresses.

Since the essential feature of the new process is the action of internal stresses produced by a suitable vapour pressure during crystallization or re-crystallization, it is obviously irrelevant whether the said pressure be produced by the additive materials themselves or by their dissociation products or reaction products, or both, or by the conjoint action of these substances.

We have also found that the above described action which assists the growth of the crystals, can be favourably affected or increased in the case of cold-worked metal bodies such as wires, single or multiple spiralled incandescent bodies and the like, by not completely sintering the metal blocks, while the afore-mentioned process is being carried out. Further sintering or, it may be, complete sintering is then carried to finality on the wires, spirals and similarly cold-worked metallic bodies produced by methods known per se from the incompletely sintered metal bodies, this further sintering or complete sintering being concurrent with the recrystallization of said cold-worked bodies. Experience has shown that the internal stresses produced by the vapour pressure of the additive materials under these conditions are more effective in assisting the growth of the crystals.

The additive materials used according to the present invention may be incorporated intimately with the metal in various ways. They produce equally good results, whether they be actually mixed with the metal itself during the production thereof or mixed with the raw materials from which the metal is produced, or permitted to form in the metal itself from their components or from their compounds or from compounds of their components during the progress of any thermal treatment connected with the production of the metal. In the production of bodies of metallic tungsten for instance, it has been found very advantageous to mix the additive materials or their components uniformly either with the tungstic acid or with the reduced metallic tungsten powder, the tungstic acid or the metallic tungsten powder being uniformly doped with true or colloidal solutions of the additional substances or their components.

The way in which the new process is carried out in practice will be more fully described in the following examples:

1. For the production of metallic tungsten bodies with a large-crystal structure or a single-crystal structure about 10.8 kgs. tungstic acid hydrate, purified in the usual way and corresponding to 10 kgs. tungstic acid anhydride, are stirred up with 8 litres water into a thin paste. To this latter are added 1 litre of a barium chloride solution which contains 13.8 grams crystallized barium chloride of the composition $BaCl_2.2H_2O$ per litre, and 1 litre of a sodium fluoride solution which contains 5.6 grams crystallized sodium fluoride (NaF) per litre. The thin paste thus obtained is then uniformly stirred up, freed from water and dried at 300° C. This mixture is reduced in a current of hydrogen at about 820° C. Each 70 grams of the metal powder are then pressed in suitable pressing moulds into bars which are afterwards heated in a current of hydrogen for about half an hour at 1100° C. to impart to them the strength required for further treatment. The bars, strengthened in this way, are then heated, by passing a low voltage alternating current of high amperage through them, in an atmosphere of hydrogen to a temperature above the sintering temperature, for the purpose of producing the coarse-crystalline structure.

Instead of the sodium fluoride solution mentioned in this example 1 litre of an ammonium fluoride solution may be used, which contains 4.94 grams crystallized ammonium fluoride ($NH_4F$) per litre.

2. Large-crystal metallic tungsten bodies may also be produced in the following manner: Firstly about 10.8 kgs. of a tungstic acid hydrate, purified in the usual way and corresponding to 10 kgs. tungstic acid anhydride are stirred up with 8 litres water into a thin paste. To this paste are added 3 litres of a 0.5% colloidal silicic acid solution and 1 litre of a magnesium chloride solution containing 100 ccms. hydrochloric acid (specific gravity 1.19) and 100.8 grams crystallized magnesium chloride, corresponding to the formula $MgCl_2.6H_2O$. The thin paste obtained is thoroughly stirred up, freed from water and dried at 300° C. The tungstic acid prepared in this way is reduced in a current of hydrogen at about 850° C. Each 150 grams of this metallic powder are then pressed in suitable pressing moulds into bars which, in order to impart to them the strength necessary for further treatment, are subsequently heated in a current of hydrogen for about half an hour at 1100° C. The bars so strengthened are sintered in an atmosphere of hydrogen by passing a low voltage alternating current of high amperage through them and are then drawn into wires in the well known way by mechanical treatment. The wires are then heated to the highest white heat for a few minutes in order to impart to them their final coarse-crystalline structure.

3. In order to produce large-crystal metallic tungsten bodies the process according to this invention may be carried out inter alia in the following way: To 10 kgs. of a finely divided metallic tungsten powder, reduced from tungstic acid in the well known way, is added 1 litre of a solution of zirconium nitrate in nitric acid, which contains per litre an amount of zirconium nitrate corresponding to 25 grams zirconium dioxide and 50 ccms. nitric acid (specific gravity 1.41). 2.48 litres of a 0.5% colloidal silicic acid solution are then added and the whole mass stirred up uniformly and freed from water, after which, in order to prevent any possible oxidation, it is dried in a current of nitrogen at 300° C. and sifted. Each 150 grams of the metallic powder thus prepared are then pressed in suitable pressing moulds into bars, which, in order to impart to them the strength necessary for further treatment, are heated for half an hour in a current of hydrogen at about 1100° C. The bars thus strengthened are then heated, by passing a low voltage alternating current of high amperage through them, in an atmosphere of hydrogen to a temperature above the sintering temperature, so as to produce the coarse-crystalline structure.

4. For the production of large-crystal tungsten bodies about 13.6 kgs. of a tungstic acid hydrate, purified in the usual way and corresponding to 10 kgs. metallic tungsten, are stirred up with 10 litres water into a thin paste. To this paste is added 1 litre of a solution of zirconium nitrate in nitric acid, which contains per litre an amount of zirconium nitrate corresponding to 25 grams zirconium dioxide and 50 ccms. nitric acid (specific gravity 1.41). 2.48 litres of a 0.5% colloidal silicic acid solution are then added and the whole mass stirred up uniformly, freed from water and dried at 300° C. The tungstic acid prepared in this way is reduced in a current of hydrogen at about 850° C. Each 150 grams of this metallic powder are then pressed in suitable pressing moulds into bars which, in order to impart to them the strength necessary for further treatment, are subsequently heated in a current of hydrogen for about half an hour at 1100° C. The bars so strengthened are treated in an atmosphere of hydrogen by passing a low voltage alternating current of high amperage through them and are then drawn into wires in the well known way by mechanical treatment. The wires are then heated to the highest white heat for a few minutes in order to impart to them their final large-crystal structure.

5. Large-crystal metallic tungsten bodies may also be produced in the following manner: 10.8 kgs. of a tungstic acid hydrate, purified in the usual way and corresponding to 10 kgs. tungstic acid anhydride, are stirred up with 8 litres water into a thin paste. To this paste are added 2.41 litres of an aluminium and iron silicate solution which consists of 1.71 litres of a 0.5% colloidal silicic acid solution and of 1 litre of an aluminium and iron chloride solution acidified with hydrochloric acid, the latter containing per litre 47.4 grams crystallized $AlCl_3 \cdot 6H_2O$, 10.11 grams crystallized $FeCl_3 \cdot 6H_2O$ and 100 ccms. hydrochloric acid of 1.19 specific gravity. The thin paste obtained is then thoroughly stirred up, freed from water and dried at 300° C. The tungstic acid prepared in this way is reduced in a current of hydrogen at about 850° C. Each 150 grams of this metallic powder are then pressed in suitable pressing moulds into bars which, in order to impart to them the strength necessary for further treatment, are subsequently heated in a current of hydrogen for about half an hour at 1100° C. The bars thus strengthened are sintered in an atmosphere of hydrogen by passing a low voltage alternating current of high amperage through them, and are then drawn into wires in the well known way by mechanical treatment. The wires are then heated to the highest white heat for a few minutes in order to impart to them their final coarse-crystalline structure.

6. Large-crystal metallic tungsten bodies according to this invention may be produced as follows: 10.8 kgs. of a tungstic acid hydrate, purified in the usual way and corresponding to 10 kgs. tungstic acid anhydride, are stirred up with 8 litres water into a thin paste. To this paste are added 2.144 litres of a 0.5% colloidal silicic acid solution and 1 litre of an uranyl nitrite solution containing 50 ccms. nitric acid (specific gravity 1.41) and 46.5 grams crystallized uranyl nitrate corresponding to the formula $UO_2(NO_3)_2 \cdot 6H_2O$. The thin paste obtained is then thoroughly stirred up, freed from water and dried at 300° C. The tungstic acid prepared in this way is reduced in a current of hydrogen at about 850° C. Each 70 grams of this metallic powder are then pressed in suitable pressing moulds into bars which, in order to impart to them the strength necessary for further treatment, are subsequently heated in a current of hydrogen for about half an hour at 1100° C. The bars, strengthened in this way, are then heated, by passing a low voltage alternating current of high amperage through them, in an atmosphere of hydrogen to a temperature above the sintering temperature, for the production of large-crystalline structure.

7. The production of large-crystal metallic tungsten bodies according to this invention may be carried out in the following manner: 10.8 kgs. of a tungstic acid hydrate, purified in the usual way and corresponding to 10 kgs. tungstic acid anhydride, are stirred up with 8 litres of water into a thin paste. To this paste are added 2 litres of a boric acid solution containing 100 ccms. hydrochloric acid (specific gravity 1.19) and 41.2 grams crystallized boric acid, corresponding to the formula $H_3BO_3$, further 1 litre of an uranyl nitrate solution containing 46.5 grams crystallized uranyl nitrate of the composition $UO_2(NO_3)_2 \cdot 6H_2O$, and, in order to impart, during the pressing, better working properties to the reduced metallic powder, as a cementing material 1 litre of a potassium chloride solution containing 50 grams crystallized potassium chloride (KCl). The thin paste thus obtained is then uniformly stirred up, freed from water and dried at 300° C. This mixture is reduced in a current of hydrogen at about 820° C. Each 70 grams of metallic powder are then pressed in suitable pressing in moulds into bars, which are afterwards heated in a current of hydrogen for about half an hour at 1100° C. in order to impart to them the strength required for further treatment. The bars, strengthened in this way, are then heated, by passing a low voltage alternating current of high amperage through them, in an atmosphere of hydrogen to a temperature above the sintering temperature for the purpose of producing the single-crystal structure.

8. Another example for the production of large-crystal metallic tungsten bodies according to this invention is as follows: 10.8 kgs. of a tungstic acid hydrate purified in the usual way and corresponding to 10 kgs. tungstic acid anhydride are stirred up with 8 litres water into a thin paste. To this paste are added 2 litres of a boric acid solution containing 41.2 grams crystallized boric acid ($H_3BO_3$), further 1 litre of an aluminium and an iron chloride solution, containing 100 ccms. hydrochloric acid (specific gravity 1.19). 23.7 grams crystallized $AlCl_3 \cdot 6H_2O$ and 10.15 grams crystallized $FeCl_3 \cdot 6H_2O$ and also, in order to impart better working properties to the reduced metallic powder during the pressing, as a cementing material 1 litre potassium chloride solution containing 50 grams crystallized potassium chloride (KCl). The thin paste thus obtained is then uniformly stirred up, freed from water and dried at 300° C. This mixture is reduced in a current of hydrogen at about 820° C. Each 70 grams metallic powder are then pressed in suitable pressing moulds into bars, which are afterwards heated in a current of hydrogen for about half an hour at 1100° C. in order to impart to them the strength required for further treatment. The bars, strengthened in this way, are then heated, by passing a low voltage alternating current of high amperage through them, in an atmosphere of hydrogen to a temperature above the sintering temperature for the purpose of producing the large-crystalline structure.

9. Another method of obtaining large-crystal metallic tungsten bodies according to this invention is described in the following example. 10.8 kgs. of a tungstic acid hydrate purified in the usual way and corresponding to 10 kgs. tungstic acid anhydride, are stirred up thoroughly with 8 litres of water into a thin paste. To this paste are added 1 litre of a phosphoric acid solution containing 44.4 ccms. phosphoric acid (specific gravity 1.70) which corresponds to about 65.2 grams phosphoric acid ($H_3PO_4$) and 1 litre of a beryllium chloride solution corresponding to 10 grams beryllium oxide acidified with 100 ccms. hydrochloric acid, and also in order to impart during the pressing better working properties to the reduced metallic tungsten powder, as a cementing agent 1 litre of a potassium chloride solution containing 50 grams crystallized potassium chloride. The thin paste thus obtained is then uniformly mixed, freed from water and dried at 300° C. This mixture is reduced in a current of hydrogen at about 850° C. Each 150 grams of the metallic powder are then pressed in suitable pressing moulds into bars, which are afterwards heated in a current of hydrogen for about half an hour at 1100° C. in order to impart to them the strength required for further treatment. The bars, strengthened in this way, are then treated by passing a low voltage alternating current of high amperage through them, and are then drawn into wires in the well known way by mechanical treatment. The wires are then heated to the highest white heat for a few minutes in order to impart to them their final coarse-crystalline structure.

10. Large-crystal metallic tungsten bodies can also be obtained according to this invention in the following way: 10.8 kgs. tungstic acid hydrate, purified in the usual way and corresponding to 10 kgs. tungstic acid anhydride, are stirred up thoroughly with 8 litres water into a thin paste. To this paste is added 1 litre of a solution of thorium nitrate in nitric acid, which contains per litre an amount of thorium nitrate corresponding to 25 grams thorium dioxide and 50 ccms. nitric acid (specific gravity 1.41). 1 litre of a phosphoric acid solution is then added containing 44.4 ccms. phosphoric acid of the specific gravity 1.70 which corresponds to about 65.2 grams phosphoric acid ($H_3PO_4$) and also, in order to impart during the pressing better working properties to the reduced metallic powder, as a cementing material we add 1 litre of a potassium chloride solution containing 50 grams crystallized potassium chloride. The thin paste thus obtained is then thoroughly mixed, freed from water and dried at 300° C. This mixture is reduced in a current of hydrogen at about 850° C. Each 150 grams of the metallic powder are then pressed in suitable pressing moulds into bars, which are afterwards heated in a current of hydrogen for about half an hour at 1100° C. in order to impart to them the strength required for further treatment. The bars, strengthened in this way, are then treated by passing a low voltage alternating current of high amperage through them, and are then drawn into wires in the well known way by mechanical treatment. The wires are then heated to the highest white heat in an inert atmosphere for a few minutes in order to impart to them their final large-crystalline structure.

In the Examples 1-4 and 6-10 we add to the tungstic acid or to the tungsten metallic powder not the useful ingredients themselves, but the chemical compounds of their components. These chemical compounds, when used alone, do not exert any beneficial effect, because, as we have found, they do not set up such internal stresses in the metal bodies, as are necessary for the production of large crystals. For example neither the aluminium chloride or aluminium oxide, thorium nitrate or oxide, zirconium nitrate or oxide, uranium nitrate or oxide etc. nor the silicic acid, boric acid or phosphoric acid etc., when used alone by themselves exert the beneficial effect described and claimed. But when, as we have found, the chemical compounds, described in our examples, are incorporated together in the tungstic acid or in the metallic tungsten powder, then during the heat treatments, adopted in the manufacturing process, these compounds together set up such internal stresses, as are able to produce the large- or even single-crystals. This fact shows very clearly, that the chemical compounds, which according to our invention are incorporated in the metal bodies in the course of the manufacturing processes, form, during the heat treatments, new and efficient ingredients, for instance silicates, borates, phosphates etc.

It is a great advantage of the new process that large-crystal bodies can be obtained with certainty, independently of the structure of the metal powder at the start of the process and further, that metal bodies produced by this process do not have to be subjected to any particular heat treatment especially for the purpose of imparting to them a large-crystalline structure, as their large-crystal structure is formed during crystallization or re-crystallization by the internal stresses, which necessarily arise in the process according to the present invention, the formation of such structure being independent of the method of heat treatment employed. Metal bodies produced by this process, such as wires, incandescent bodies and the like possess considerably greater strength and durability as regards their shape, particularly at high temperatures, than metal bodies which are produced by the well known processes hitherto employed, and they are consequently particularly well suited for the manufacture of incandescent bodies in multiple spiral form.

The large-crystalled metal bodies produced by the new process are also distinguished by the great uniformity of their crystalline structure.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. The process of producing large-crystalled bodies from tungsten which consists in incorporating with a finely divided tungsten compound reducible by hydrogen an additive material belonging to the group of compounds consisting of silicates, borates, phosphates and fluorides which do not volatilize at the sintering temperature of the tungsten, but develop a vapor pressure in the tungsten bodies when these latter are heated to the crystallization temperature and thereby set up internal stresses, subjecting the composition to a reduction in hydrogen to form composite metal bodies from the finely divided powder, and then heating to at least the crystallization temperature of the tungsten.

2. The process of producing large-crystalled bodies from tungsten which consists in incorporating with a finely divided tungsten compound reducible by hydrogen a silicate which does not volatilize at the sintering temperature of the tungsten, but develops a vapor pressure in the tungsten bodies when these latter are heated to the crystallization temperature and thereby sets up internal stresses, subjecting the composition to a reduction in hydrogen to form composite metal bodies from the finely divided powder, and then heating to at least the crystallization temperature of the tungsten.

3. The process of producing large-crystalled bodies from tungsten which consists in incorporating with a finely divided tungsten compound reducible by hydrogen a phosphate which does not volatilize at the sintering temperature of the tungsten, but develops a vapor pressure in the tungsten bodies when these latter are heated to the crystallization temperature and thereby sets up internal stresses, subjecting the composition to a reduction in hydrogen to form composite metal bodies from the finely divided powder, and then heating to at least the crystallization temperature of the tungsten.

4. The process of producing large-crystalled bodies from tungsten which consists in incorporating with a finely divided tungsten compound reducible by hydrogen a fluoride which does not volatilize at the sintering temperature of the tungsten, but develops a vapor pressure in the tungsten bodies when these latter are heated to the crystallization temperature and thereby sets up internal stresses, subjecting the composition to a reduction in hydrogen to form composite metal bodies from the finely divided powder, and then heating to at least the crystallization temperature of the tungsten.

THEODORE MILLNER.
PAUL TURY.